US008317882B2

(12) United States Patent
Chen et al.

(10) Patent No.: US 8,317,882 B2
(45) Date of Patent: Nov. 27, 2012

(54) METHOD OF MANUFACTURING A PLANAR ELECTRODE WITH LARGE SURFACE AREA

(75) Inventors: Po-Jui Chen, Mountain View, CA (US); Gary Yama, Mountain View, CA (US); Matthieu Liger, San Francisco, CA (US); Matthias Illing, Palo Alto, CA (US)

(73) Assignee: Robert Bosch GmbH, Stuttgart (DE)

( * ) Notice: Subject to any disclaimer, the term of this patent is extended or adjusted under 35 U.S.C. 154(b) by 518 days.

(21) Appl. No.: 12/508,894

(22) Filed: Jul. 24, 2009

(65) Prior Publication Data
US 2011/0019337 A1    Jan. 27, 2011

(51) Int. Cl.
*H01G 9/00*    (2006.01)
(52) U.S. Cl. ................................. 29/25.03
(58) Field of Classification Search .............. None
See application file for complete search history.

(56) References Cited

U.S. PATENT DOCUMENTS
2006/0234505 A1* 10/2006 Asano et al. ............... 438/688

OTHER PUBLICATIONS

Asoh et al., Conditions for Fabrication of Ideally Ordered Anodic Porous Alumina Using Pretexured A1, Journal of the Electrochemical Society, 2001, B152-B156, 148 (4), ECS, Japan, 5 pages.
Beckman Coulter, Inc., Introducing the MultisizerTM 3 Coulter Counter (Reg. U.S. Pat. & Tm. Off.), The Beckman Coulter Technology Center, 12 pages.
Chan et al., High-performance lithium battery anodes using silicon nanowires, Nature Nanotechnology, Jan. 2008, pp. 31-35, vol. 3, Nature Publishing Group, USA, 5 pages.
Evans et al., Growth and properties of gold and nickel nanorods in thin film alumina, Nanotechnology, 2006, pp. 5746-5753, vol. 17, IOP Publishing Ltd., UK, 8 pages.
Gawad et al., Micromachined impedance spectroscopy flow cytometer for cell analysis and particle sizing, Lab on a Chip, 2001, pp. 76-82, vol. 1, RSC Publishing, Switzerland, 7 pages.
Hendren et al., Fabrication and optical properties of gold nanotube arrays, Journal of Physics: Condensed Matter, 2008, pp. 1-5, vol. 20, IOP Publishing Ltd., UK, 5 pages.
Jiang et al., Planar MEMS Supercapacitor Using Carbon Nanotube Forests, Mechanical Engineering Department, University of California, Berkeley, CA, undated, 4 pages.
Lee et al., Layer-by-Layer Assembly of All Carbon Nanotube Ultrathin Films for Electrochemical Applications, Journal of the American Chemical Society, Sep. 8, 2008, Cambridge, ACS Publications, 10 pages.
Leskala et al., Atomic Layer Deposition Chemistry: Recent Developments and Future Challenges, Angewandte Chemie International Edition, 2003, pp. 5548-5554, vol. 42, Wiley-VCH Verlag GmbH & Co., Germany, 7 pages.

(Continued)

*Primary Examiner* — Seahvosh Nikmanesh
(74) *Attorney, Agent, or Firm* — Maginot, Moore & Beck

(57) ABSTRACT

A method for fabricating a pair of large surface area planar electrodes. The method includes forming a first template above a first substrate, the first template having a first plurality of pores, coating the first plurality of pores of the first template with a first layer of conducting material to form a first electrode, placing the first plurality of pores of the first electrode in proximity to a second electrode, thereby forming a gap between the first plurality of pores and the second electrode, and filling the gap with an electrolyte material.

15 Claims, 13 Drawing Sheets

OTHER PUBLICATIONS

Zheng et al., Micro coulter counters with platinum black electroplated electrodes for human blood cell sensing, Biomed Microdevices, 2008, pp. 10:221-231, Springer Science, U.S., 11 pages.
Cheung et al., Impedance Spectroscopy Flow Cytometry: On-Chip Label-Free Cell Differentiation, Cytometry, 2005, pp. Part A 65A:124-132, Wiley-Liss, Inc., 9 pages.
Banerjee et al., Nanotubular metal-insulator-metal capacitor arrays for energy storage, nature nanotechnology, Mar. 2009, pp. 1-5, Macmillan Publishers, 5 pages.
Banerjee et al., Nanotubular metal-insulator-metal capacitor arrays for energy storage, Nature Nanotechnology, Mar. 15, 2009, pp. 1-5, No. 37, Macmillan Publishers Limited, U.S.A.
Qu et al., Studies of activated carbons used in double-layer capacitors, Journal of Power Sources, 1998, pp. 99-107, No. 74, Elsevier Science S.A., Canada.
Obreja, On the performance of supercapacitors with electrodes based on carbon nanotubes and carbon activated material—A Review, Physica E, 2008, pp. 2596-2605, No. 40, Elsevier B.V., Romania.

* cited by examiner

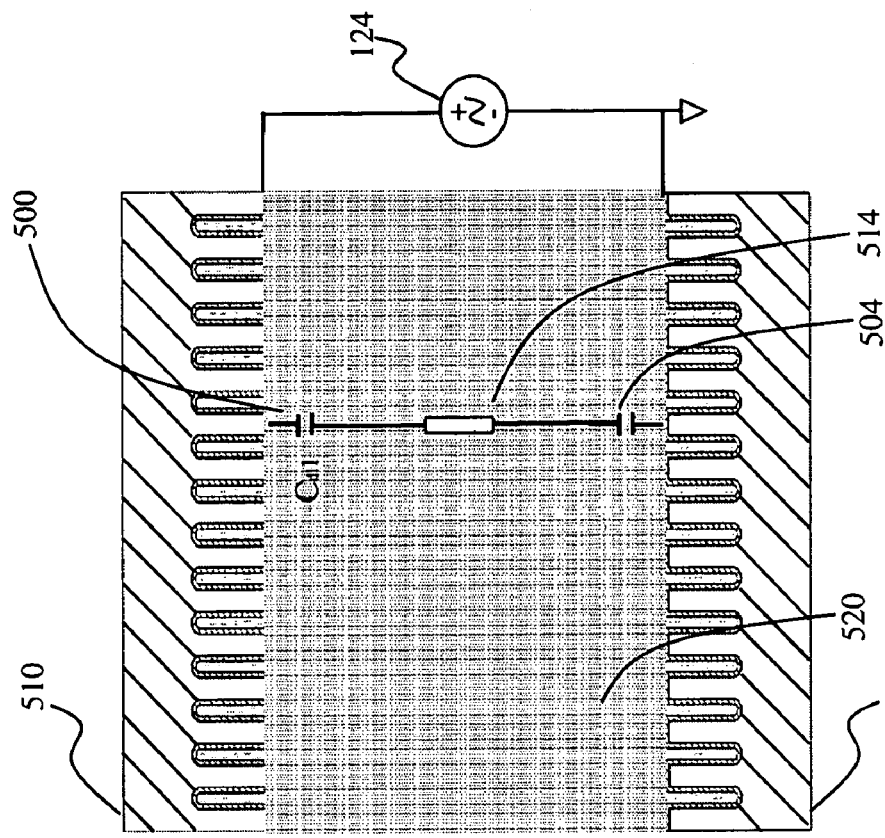
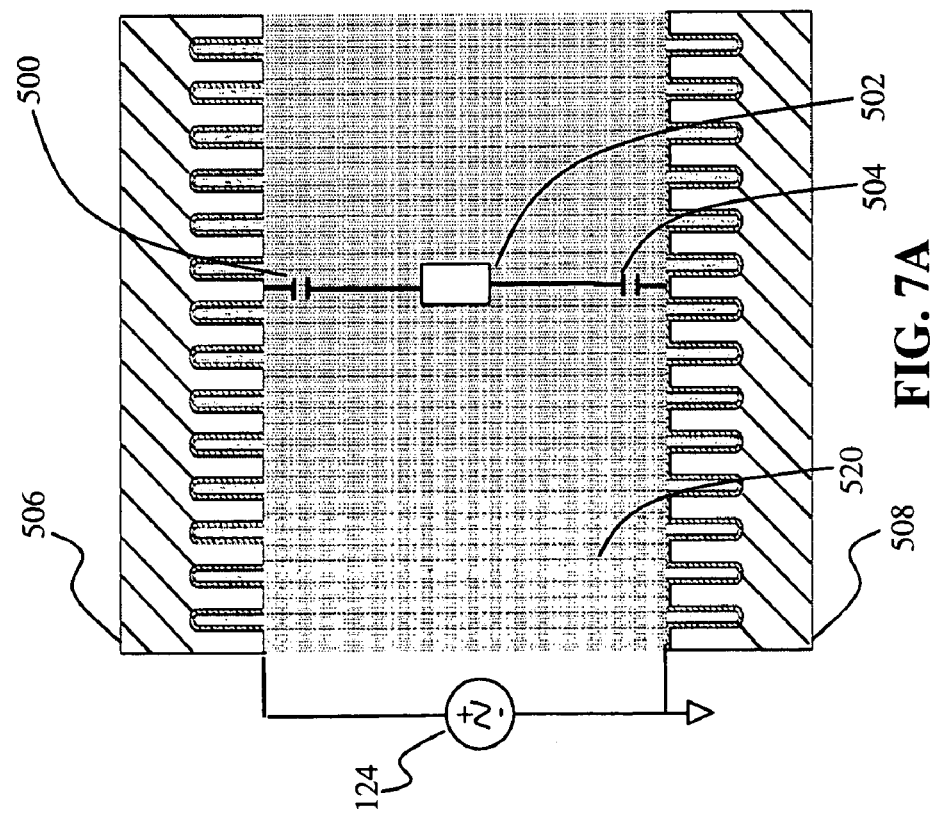
FIG. 7B
FIG. 7A

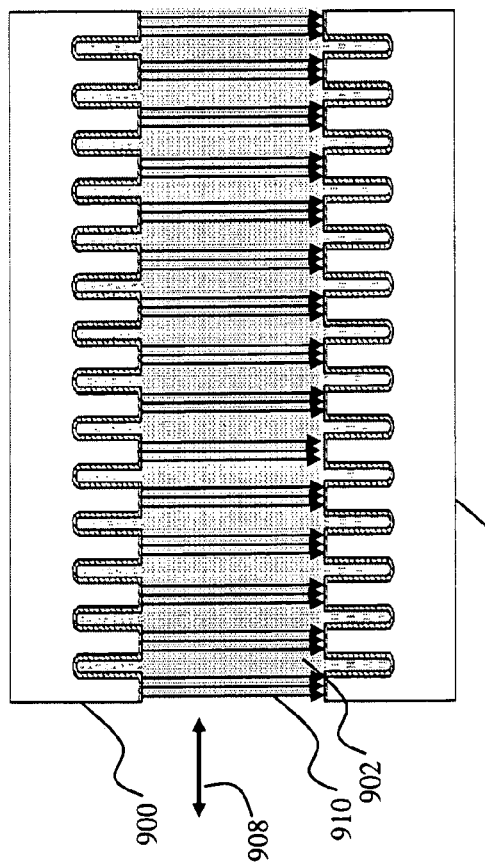
FIG. 10A
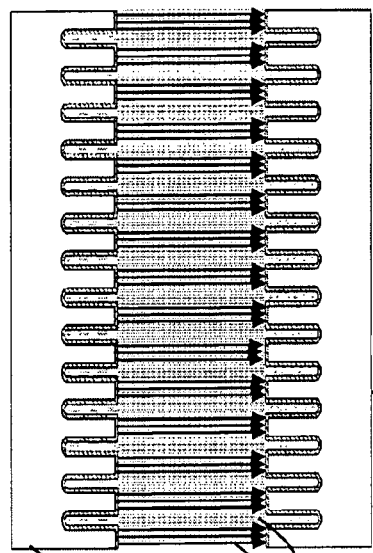
FIG. 10B
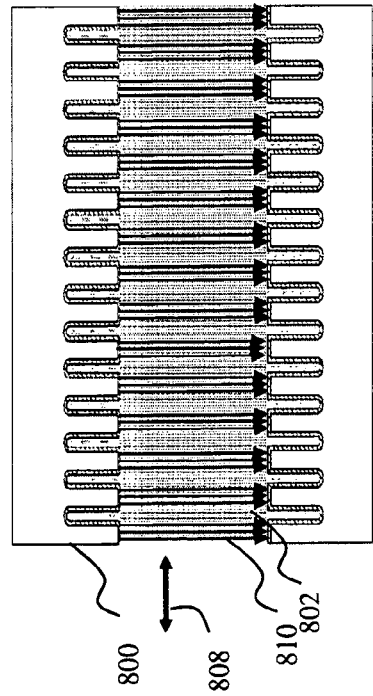

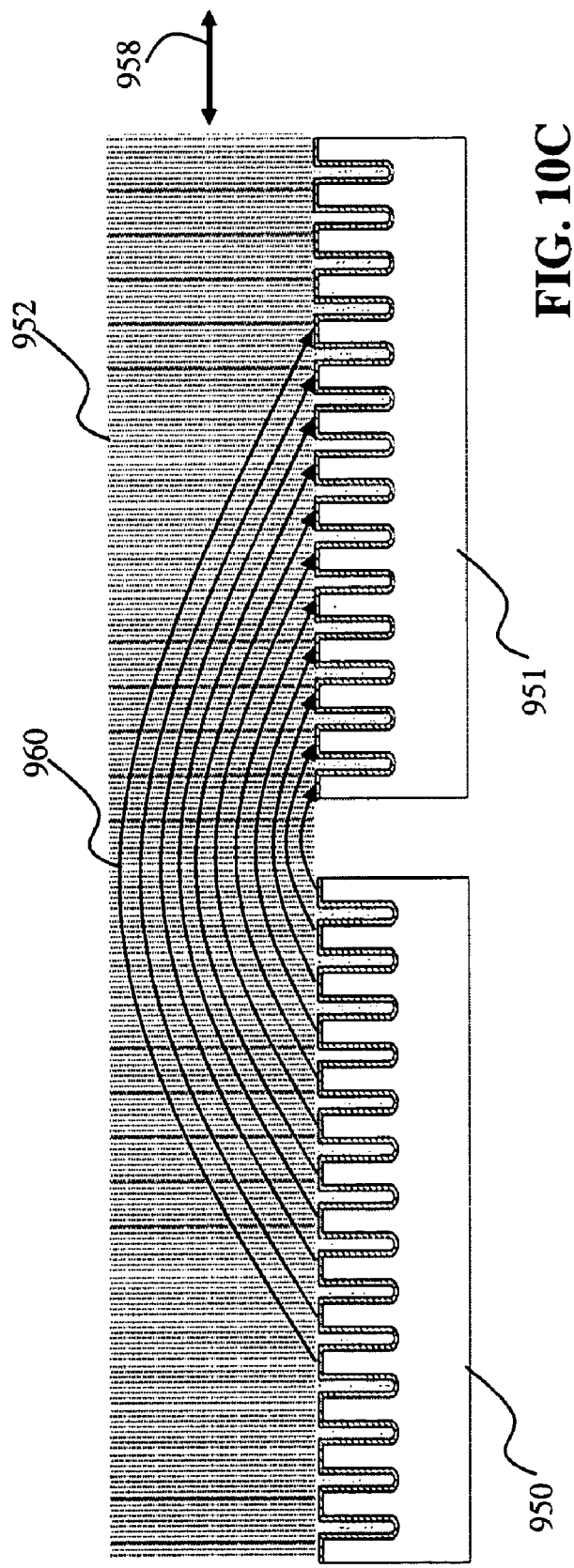

METHOD OF MANUFACTURING A PLANAR ELECTRODE WITH LARGE SURFACE AREA

FIELD

The present invention relates generally to planar electrodes and more particularly to planar electrodes with large surface area.

BACKGROUND

Planar electrodes are used in a variety of applications including Coulter counters, supercapacitors, and high capacity batteries. In many applications the planar electrodes are in contact with an electrolyte. A layer of charge that collects on the planar electrode is matched by a layer of charge in the electrolyte. This combination of charge layers results in a capacitor commonly referred to as an electric double layer capacitor (EDLC). An example of a prior art EDLC is shown in FIG. 1.

In applications where planar electrodes are used to monitor presence of particles in the electrolyte or to measure the number and size of each particle as the particle is going by the electrodes, certain characteristics of the electrodes can play a significant role in the measurements. For example, capacitance of the EDLC can play a significant role in the accuracy of measurements.

In applications where charge storage is the objective of a capacitor, e.g., supercapacitors or batteries for electrical cars, maximizing the capacitance is an important goal. Supercapacitors differ from other commonly known capacitors in the amount of capacitance. Generally, supercapacitors have much larger capacitance by way of larger electrodes. Physical size constraints as well as mechanical constraints, however, prevent producing capacitors with excessively large plates (electrodes).

In both of the above applications, attempts have been made in the prior art to provide a porous structure for the electrodes. The porous structure provides a larger surface area and thereby a larger capacitance. Both carbon nanotube technology and platinum black electrodes have been shown to provide porous features that can be used to increase the EDLC. Both of these schemes, however, present challenges. For example, processing involved in fabricating platinum black electrodes is 1) not a full dry process and/or 2) does not result in a well controlled electrode material. Similarly, carbon nanotube growth does not provide a well controlled electrode material. Furthermore, neither of these solutions is well suited for mass production with commonplace semiconductor technology processing steps.

Therefore, a need exists to address the stated shortcomings of the prior art. Particularly, there is a need to provide mass production of planar electrodes having large surface areas using common semiconductor processing techniques that can result in a well controlled electrode material.

SUMMARY

In accordance with one embodiment, a method for fabricating a pair of large surface area planar electrodes is disclosed. The method includes forming a first template above a first substrate, the first template having a first plurality of pores, coating the first plurality of pores of the first template with a first layer of conducting material to form a first electrode, placing the first plurality of pores of the first electrode in proximity to a second electrode, thereby forming a gap between the first plurality of pores and the second electrode, and filling the gap with an electrolyte material.

In another embodiment, a device is disclosed. The device include a first electrode comprising a first template formed above a first substrate, a first plurality of pores formed on the first template, and a first layer of conducting material coated on the first template, a second electrode comprising a second template formed above a second substrate, a second plurality of pores formed on the second template, and a second layer of conducting material coated on the second template, the second plurality of pores of the second electrodes and the first plurality of pores of the first electrode separated by a gap, an electrically conducting material disposed in the gap, and an electrical power source coupled to the first and the second electrodes to place electrical charge between the first and the second electrodes.

BRIEF DESCRIPTION OF THE DRAWINGS

The above described features and advantages, as well as others, will become more readily apparent to those of ordinary skill in the art by reference to the following detailed description and accompanying drawings.

FIGS. 7A-7B depict a lumped parameter model of a pair of planar electrodes configured to provide a platform for modeling the electrodes in accordance with one embodiment;

FIGS. 10A-10C depict three configurations of pairs of planar electrodes according to different embodiments.

DETAILED DESCRIPTION

Figure 1:
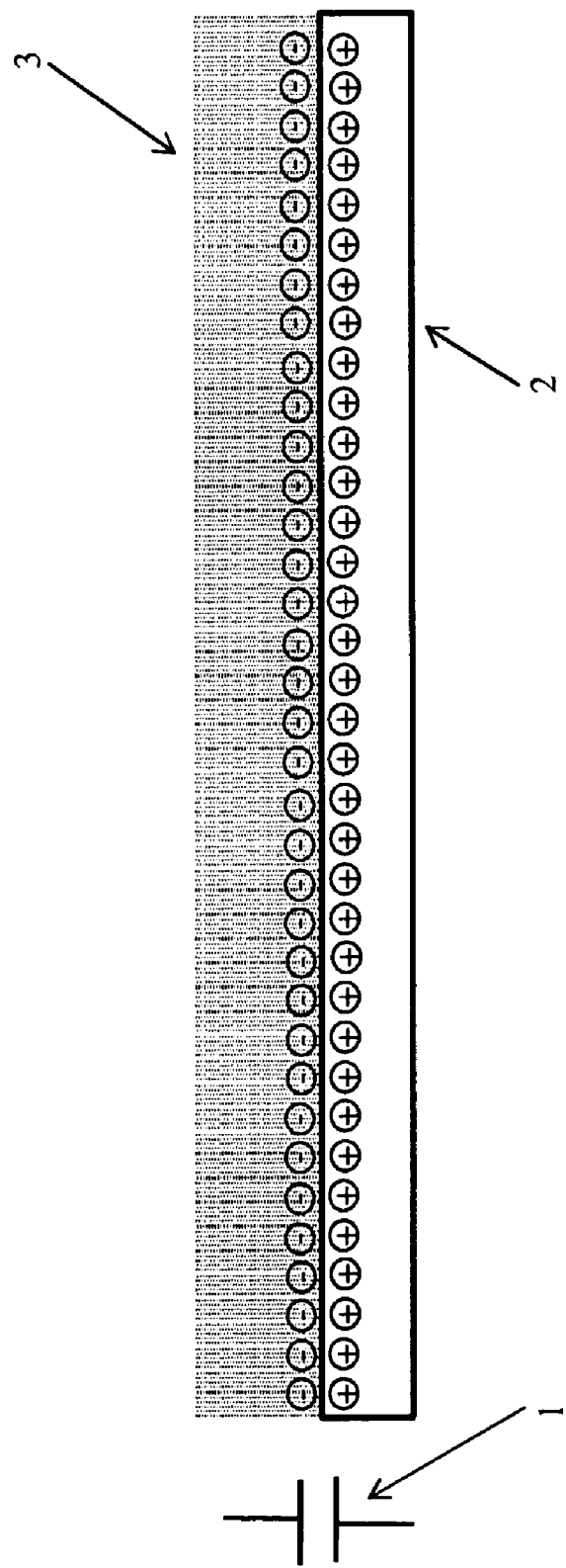
FIG. 1 depicts a planar electrode of the prior art with a EDLC.

For the purposes of promoting an understanding of the principles of the invention, reference will now be made to the embodiments illustrated in the drawings and described in the following written specification. It is understood that no limitation to the scope of the invention is thereby intended. It is further understood that the present invention includes any alterations and modifications to the illustrated embodiments and includes further applications of the principles of the invention as would normally occur to one skilled in the art to which this invention pertains.

Figure 2:
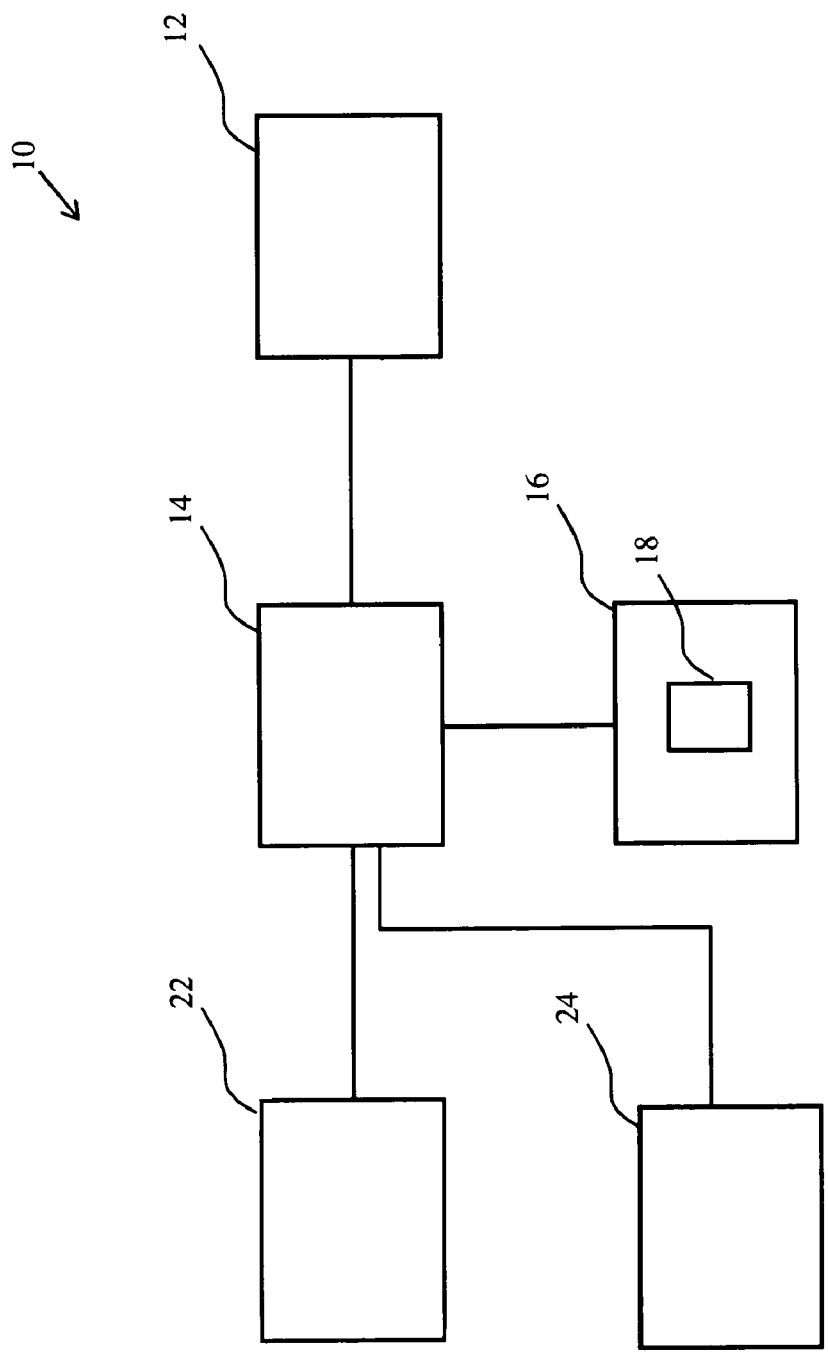
FIG. 2 depicts a block diagram of a system in communication with the pair of planar electrodes.

Referring to FIG. 2, there is depicted a representation of a planar electrode system generally designated 10 for supporting the pair of planer electrodes. The planar electrode system 10 includes an I/O device 12, a processing circuit 14 and a memory 16. The I/O device 12 may include a user interface, graphical user interface, keyboards, pointing devices, remote and/or local communication links, displays, and other devices that allow externally generated information to be provided to the planar electrode system 10, and that allow internal information of the planar electrode system 10 to be communicated externally.

The processing circuit 14 may suitably be a general purpose computer processing circuit such as a microprocessor and its associated circuitry. The processing circuit 14 is operable to carry out the operations attributed to it herein.

Within a memory 16 are various program instructions 18. The program instructions 18 are executable by the processing circuit 104 and/or any other components as appropriate.

The planar electrode system 10 further includes a working electrode stimulus/response circuit 22 and a reference electrode stimulus/response circuit 24 connected to the processing circuit 14. The working electrode stimulus/response circuit 22 provides a stimulus for a pair of working planar electrodes 100/101 (See FIG. 3) and measures the effects of the stimulus. The stimulus may be controlled by the processing circuit 14 and the measured value is communicated to the processing circuit 14. The reference electrode stimulus/response circuit 24 provides a stimulus for the pair of reference planar electrodes (100/101) and measures the effect of that stimulus which is communicated to the processing circuit 14.

Figure 3:
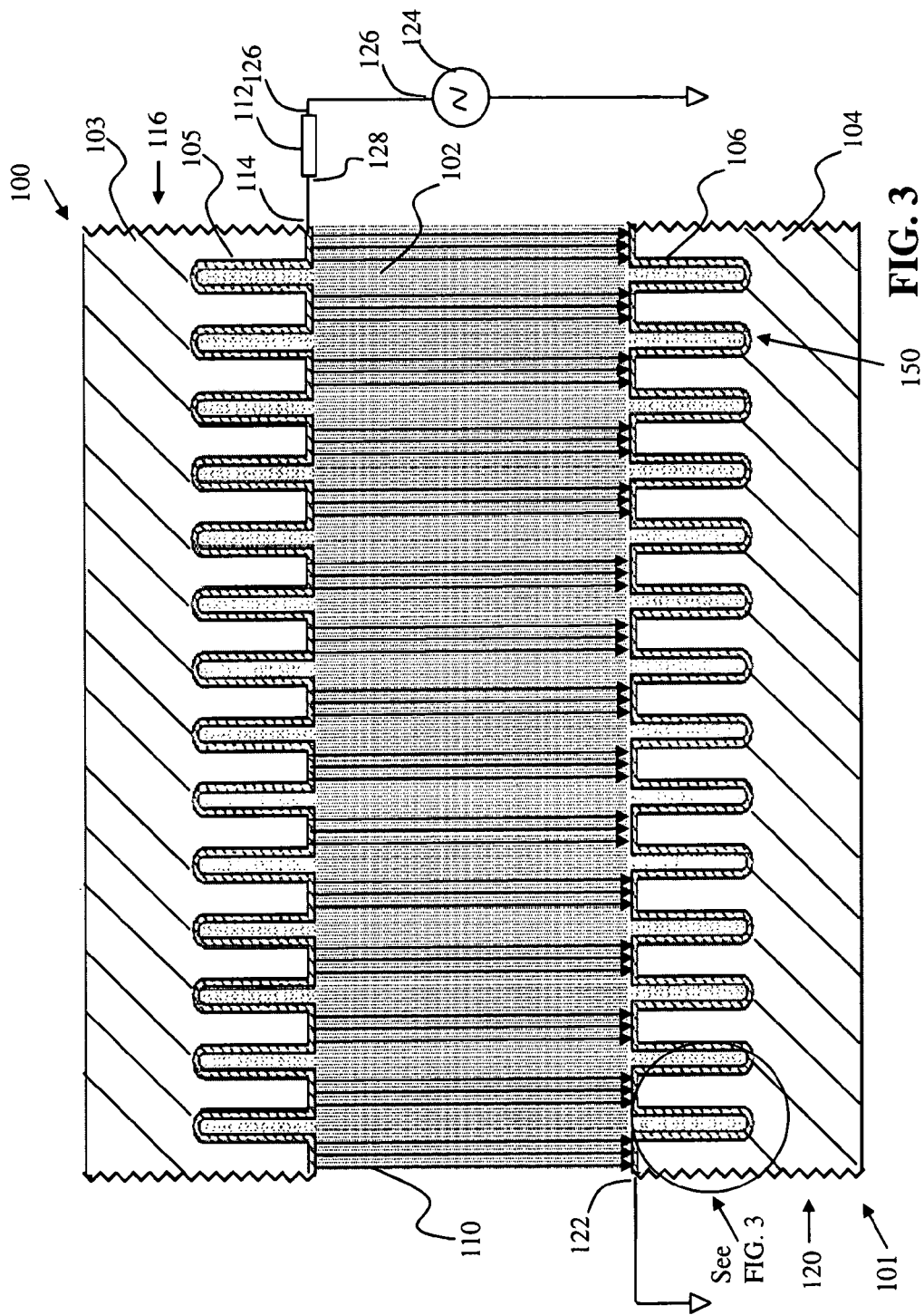
FIG. 3 depicts a pair of planar electrodes in accordance with one embodiment.

Referring to FIG. 3, a cross sectional view of the pair of planar electrodes 100/101 configured in a vertical orientation is depicted. The planar electrodes 100/101 have opposing symmetry with respect to a central line passing through a dielectric 102 present between the two planar electrodes 100/101. Each of the planar electrodes 100/101 in this embodiment is formed with a separate substrate 103/104. The substrates 103/104 have porous features 150. In one embodiment, as shown in FIG. 3, a conductive material layer 105/106 is deposited on the porous features 150 to provide electrical connectivity to outside circuitry. The electrolyte 102 provides electrical conductivity between the pair of planar electrodes 100.

An AC source 124 applies an AC signal to the pair of planar electrodes 100/101 through contacting points 114 and 122 with the conductive material layer 105/106. The AC source 124 is part of the working electrode stimulus/response circuit 22 and also part of the reference electrode stimulus/response circuit 24. One terminal 126 of the AC source 124 connects to a sense resistor 112. The sense resistor 112 is also connected to the planar electrode 100 at a connection point 114 located on the right hand side (designated by reference numeral 116) of the planar electrode 100. The connection point 114 can be a terminal configured for making electrical connection as well as for making electrical measurements by way of applying a probe, e.g., an oscilloscope probe. An electrical circuit is completed by connecting the planar electrode 101 to the electrical ground. This connection is made at a connection point 122 which is located on the left hand side (designated by reference numeral 120) of the planar electrode 101. The AC source 124 produces current lines 110 between the pair of planar electrodes 100/101.

Each pair of planar electrodes 100/101 separated by the electrolyte 102 forms a basis for measuring changes in electrical characteristics between the pair of electrodes 100/101. An example of such a characteristic is the resistance between the pair of planar electrodes 100/101 which is provided mainly by the resistance of the electrolyte 102. When a particle moves between the pair of electrodes 100/101, the particle displaces the electrolyte 102. This displacement of electrolyte 102 causes a change in the resistance between the pair of electrodes 100/101. The electrolyte 102, therefore, must be selected to have a resistance that is different than the resistance of the particle that passes through the electrolyte 102.

As mentioned above, an electrical circuit is formed between the terminal 126 of the AC source 124, the sense resistor 112, the connecting point 114, the planar electrode 100, the electrolyte 102, the planar electrode 101, the connecting point 122 and the electrical ground. The connecting point 114 is coupled to conductive material 105, while connecting point 122 is coupled to conducing material 106.

Application of the AC signal from the AC source 124 to the sense resistor 112 generates an AC current that can be calculated by measuring the voltage difference across the sense resistor 112 at terminals 126 and 128 and dividing this voltage difference by the resistance of the sense resistor 112. The same AC current also passes through the planar electrode 100, the electrolyte 102, the planar electrode 101 and closes a current loop by terminating at the electrical ground through the connecting point 122. The resistance between the planar electrodes 100/101 can be calculated by measuring the voltage difference between connecting points 114 and 122 and dividing this voltage difference by the calculated current through the sense resistor 112.

In one embodiment, the calculated resistance between the pair of planar electrodes 100/101 can be used to establish a baseline by storing the resistance in the memory 16. In such an embodiment, a pair of reference electrodes and the associated circuits, e.g. reference electrode stimulus/response circuit 24, can be omitted. In another embodiment a pair of planar electrodes can be used as reference electrodes. A reference electrodes is used to establish a baseline for the working electrodes. The working electrodes are used to measure certain characteristics of a particle passing between the working electrodes. For example, when a particle is passing between the pair of electrodes 100/101, the resistance between the electrodes changes. Continuing measuring the resistance can provide the change in resistance by comparing to the baseline resistance which is either held in memory 16 or calculated by way of reference electrodes. More on the change of resistance between the pair of planar electrodes 100/101 will be provided, below.

Figure 4:
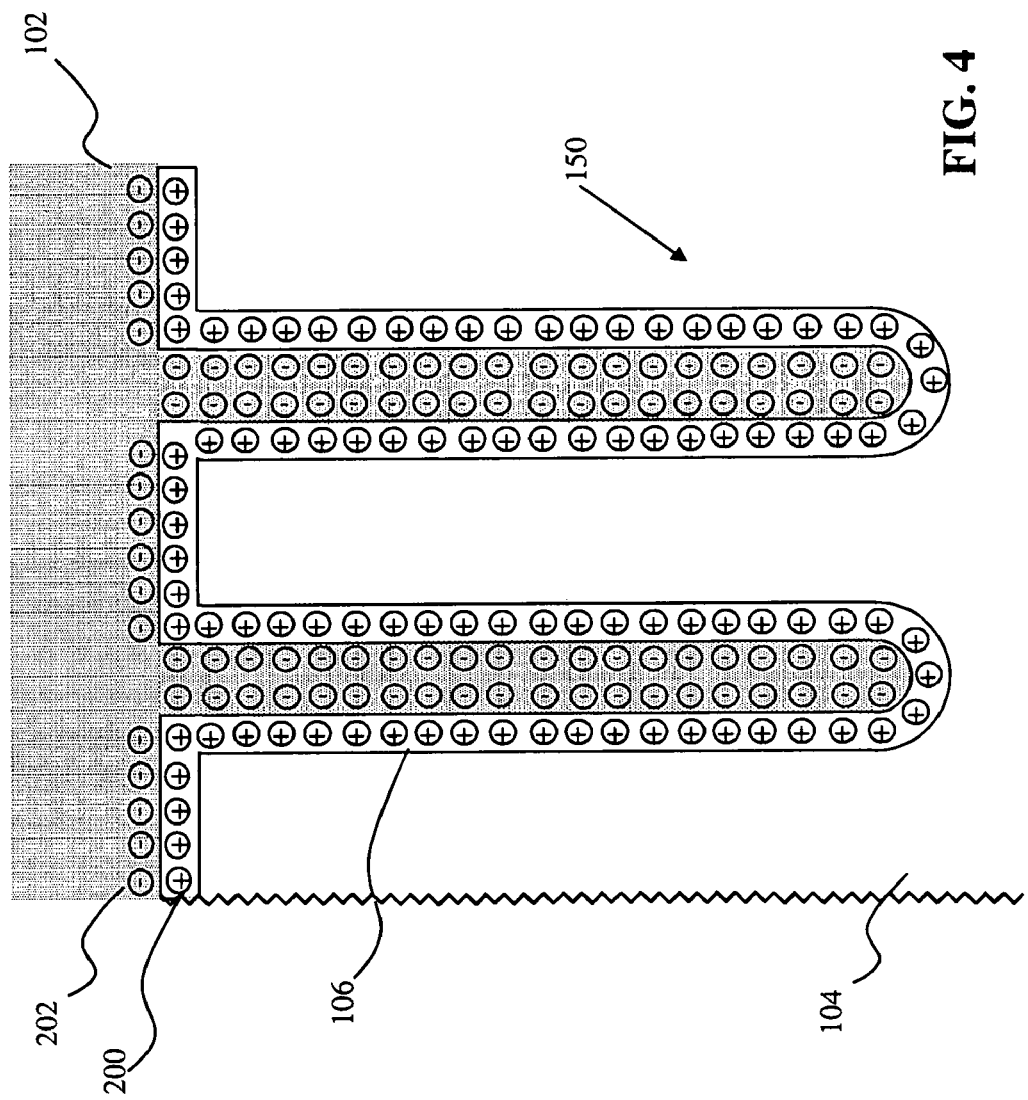
FIG. 4 depicts a portion of one of the planar electrodes shown in FIG. 3.

Referring to FIG. 4, a partial detailed view of a planar electrode 101 of FIG. 3 is shown. The porous features 150 shown have a continuous conductive layer 106. An EDLC is formed between the conductive material layer 106 and the electrolyte 102. On one of the electrodes of the electrode pair, positive charges 200 collect in the conductive material layer 106 while negative charges 202 collect in the electrolyte 102 near the planar electrode 100. A similar charge formation occurs on the other planar electrode 100. In that electrode (not shown in FIG. 4) negative charges collect in the conductive layer while positive charges collect in the electrolyte.

When a particle is present in the electrolyte, the resistance between the two planar electrodes alters. Electrical excitation of the pair of planar electrodes provides limited information about the particle based on the particle's volume and the amount of electrolyte the particle displaces. The EDLC provides high DC resistance making DC measurements more difficult. Conversely, if an AC excitation is used, the EDLC provides an impedance that is inversely related to the frequency of the excitation and the capacitance of the EDLC. Therefore, larger capacitances and higher frequencies yield lower AC impedances. Furthermore, an AC excitation may provide additional information about the internal structure of the particle.

Figure 5:
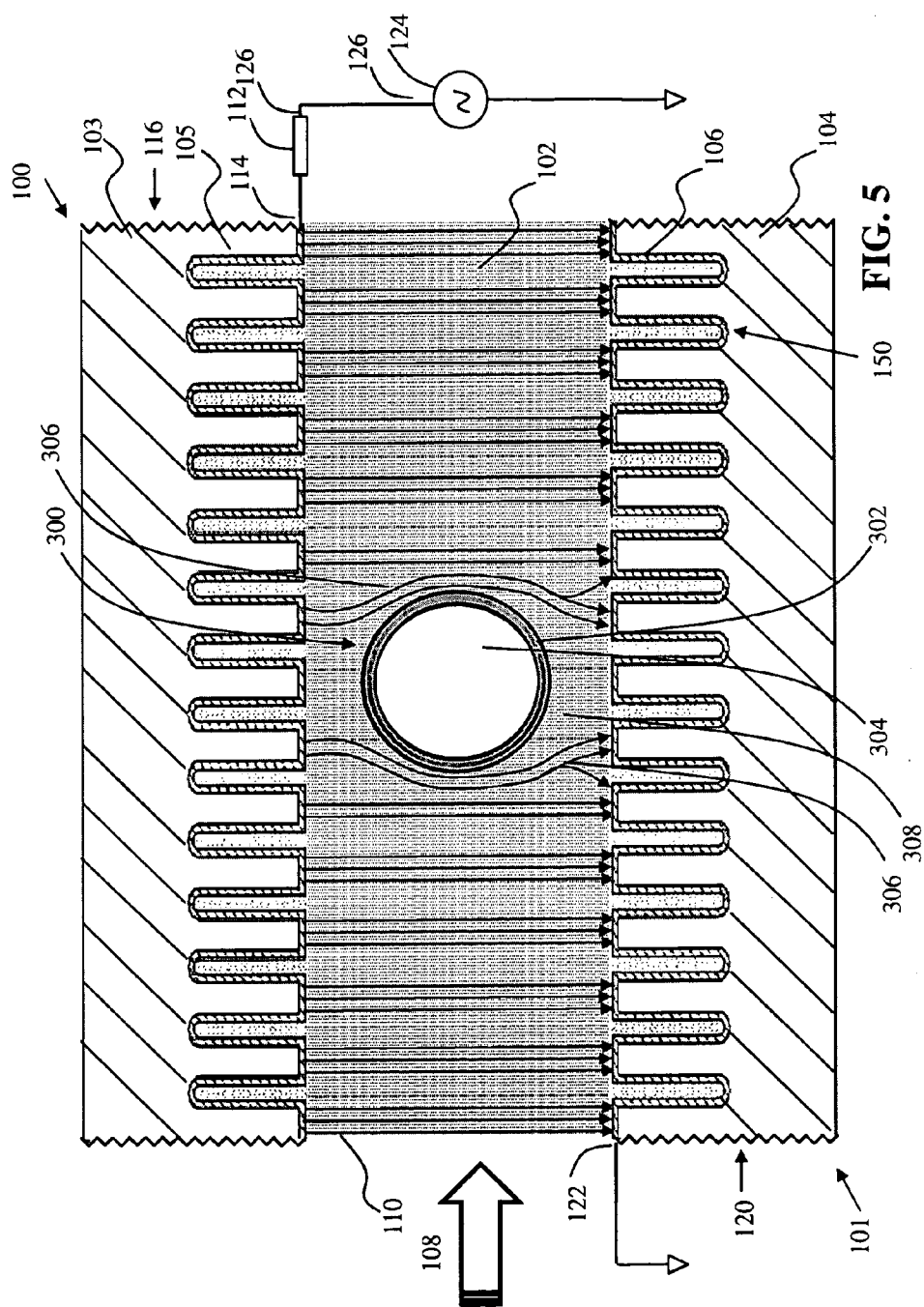
FIG. 5 depicts a pair of planar electrodes in accordance with one embodiment.

Referring to FIG. 5, a pair of planar electrodes 100/101 is shown with a particle 300 in between the electrodes. Without the particle 300 in between the pair of electrodes 100/101, the current lines are as shown by reference numeral 110. FIG. 5 shows the particle in the middle of the pair of electrodes 100/101. Some of the current lines retain the initial configuration as indicated by reference numeral 110 and some of the current lines become disturbed as shown by current lines 306. Additionally, there may be areas where there are no current lines, as indicated by reference numeral 308.

The particle 300 can be a solid particle having a resistivity that is different than the resistivity of the electrolyte 102. Alternatively, the particle 300 can be a particle of varying construction, e.g., having an internal structure 304, and a sheath of 302 having a resistivity that is different than the resistivity of the electrolyte 102. When the particle 300 surrounded by a sheath 302 material passes in between the pair of planar electrodes 100/101 the particle causes a displacement in the electrolyte. Since the particle has a resistance that is different from the electrolyte, the displacement in the electrolyte results in a change in a measured resistance between the electrodes.

In the impedance calculation, the reactance of the EDLC (one on each electrode) becomes a parasitic component. With an AC excitation across the electrodes, the impedance across the electrodes is a function of the resistance between the electrode and the reactance of the EDLC. This relationship is seen below.

$$Z = \sqrt{R^2 + X^2} \quad (1)$$

In equation (1) Z is the impedance between the pair of planar electrodes 100/101, R is the resistive component of the impedance between the electrodes 100/101, and X is the reactance. The presence of the particle 300 can change the resistive component (R) of the impedance. Since measuring changes in the resistive component is desirable to ascertain the presence of a particle, the reactance (X) becomes a parasitic component. In a purely capacitive sense, the reactance $X_c$ is governed by:

$$X_C = \frac{1}{2\pi f C} \quad (2)$$

In equation (2) f is the frequency of the AC signal and C is the capacitance between the electrodes. Reactance is inversely proportional to the capacitance of the EDLC. Therefore, increasing the capacitance serves to lower the reactance due to the EDLC, thereby minimizing its patristic effect. As a result, one way to minimize the effect of the reactance (X) in the impedance calculation is to maximize the capacitance of the EDLC. The capacitance of a capacitor is directly proportional to the area of the electrodes of the capacitor. The capacitance of each EDLC is governed by:

$$C = \varepsilon \frac{A}{d} \quad (3)$$

In equation (3) $\varepsilon$ is the dielectric constant, A is the effective area of plates of the EDLC, i.e., where charges collect on the EDLC and d is the distance between the plates. Therefore, from a dimensional point of view, increasing the effective area of the planar electrodes increases the capacitance (C), which in turn decreases the reactance ($X_c$), which in turn reduces the parasitic effect of the reactance on the impedance (Z) measurements. The planar area of electrodes, i.e., a rectilinear area of the footprint of the electrodes, however, cannot be increased to increase the capacitance. This limitation exists since increasing the planar area may result in a situation where many particles are being admitted between the electrodes, thereby making it difficult to determine if the change in impedance is a result of one or several particles. Therefore, the effective area of the electrodes needs to be increased while keeping the rectilinear area of the electrodes small so to avoid challenges related to measuring electrical characteristics associated with multiple particles passing in the vicinity of the electrodes, all at once.

With reference to the EDLC, the term d of equation (3) refers to the distance between the positive and negative charges in the so-called electric double layer (EDL) present in the electrolyte and the electrode interface. As discussed above, two sets of EDLC form, one on each electrode. This distance can be on the order 1 to several nanometers. Presence of the electrolyte between the electrodes advantageously forms the small distance which also cooperate to increase capacitance.

Figure 6:
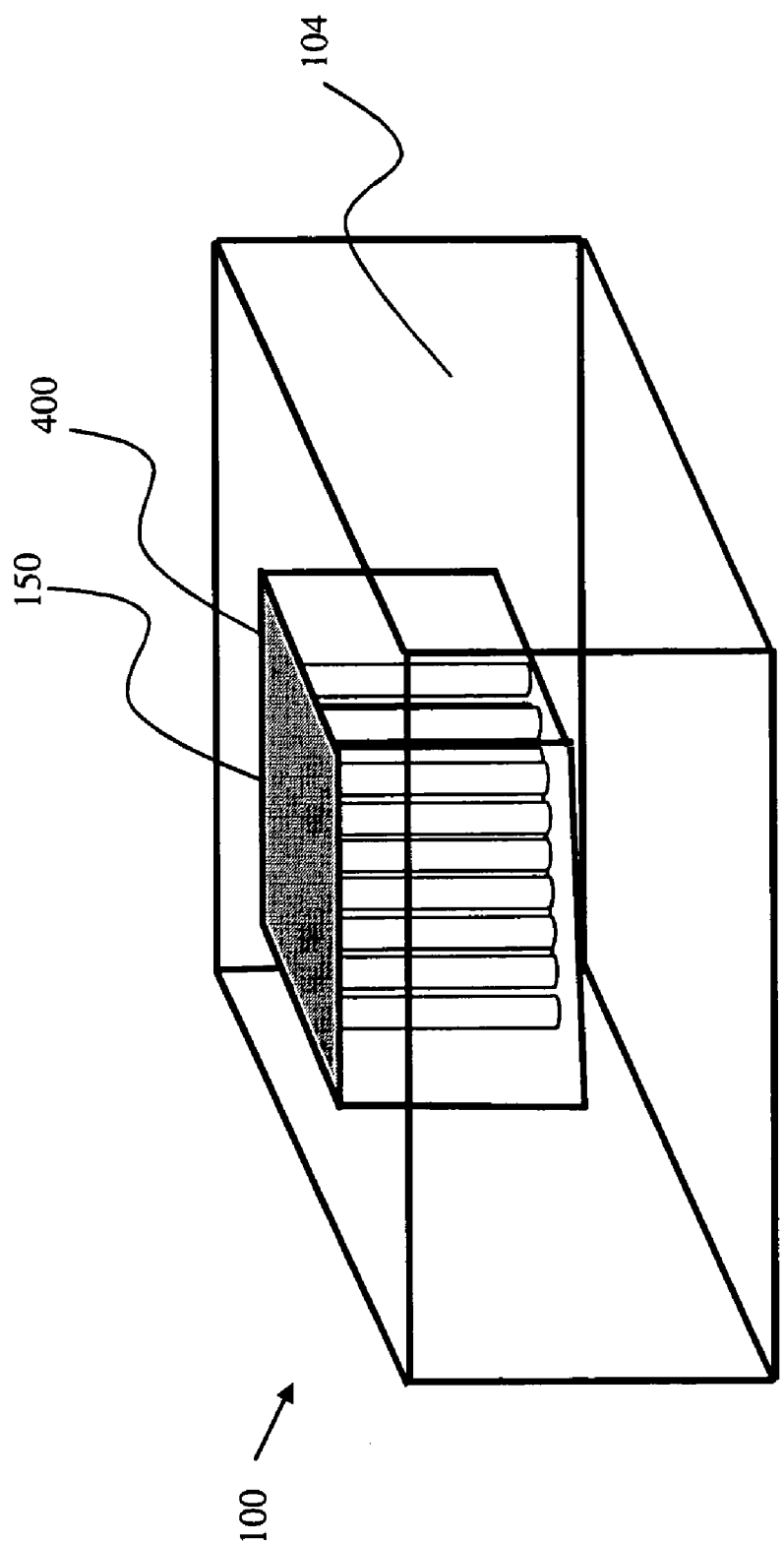
FIG. 6 depicts a perspective view of a planar electrode in accordance with one embodiment.

Referring to FIG. 6, a perspective view of the planar electrode 100 is depicted. FIG. 5. is only provided to convey certain concepts, e.g., pore density and area enhancement factor, described below. Therefore, no limitations should be attributed based on FIG. 6. The porous features 150 are shown in the shape of cylinders having effective surface area of $2\pi rh + \pi r^2$, where $\pi r^2$ is the same with the surface area without introduction of pore, and $2\pi rh$ is the increased surface area after introduction of pore with cylindrical shape. The total effective area of the planar electrode is the effective area of one cylinder multiplied by the number of cylinders in the footprint of the active area plus the area between the cylinders. This calculation assumes the cylinders are identical in shape. The area between the cylinders is simply the area of the footprint minus $\pi r^2$ multiplied by the number of cylinders. The footprint is designated by the reference numeral 400 and is here identified as A. In FIG. 6, twenty one (21) cylinders are shown. To avoid confusions, the term area enhancement factor is defined as the increased effective area of the cylinders, i.e., number of cylinders multiplied by ($2\pi rh$), divided by the footprint, i.e., A. For example, the area enhancement factor in FIG. 5 is $21(2\pi rh)/A$. Due to the multiplicative effect of the body of cylinders, it should be noted that at the highest levels of pore density, the cylinders have the smallest diameters and the smallest separation distance (pitch) in between the pores. Conversely, at the lowest levels of pore density, the cylinders have the largest diameters and the largest separation distance (pitch) in between the pores.

The porous features of the planar electrode can provide an effective area that can be much larger than the area of the footprint. In one embodiment, the pore diameters can range from about 0.1 nm to about 50 nm. Pore depths can range from about 100 nm to about 500 nm. By way of examples, the increase in the effective area is demonstrated below. If the pores are in 2 nm diameters, 500 nm in depth, and with 2nm pitch for design convenience, the effective area of one cylinder can be calculated to be $1000\pi$ nm$^2$, i.e., $(2*\pi*1*500)$nm$^2$. In an area of 1000 nm by 1000 nm (footprint), there can be approximately 250 (1000 nm/(2+2) nm) cylinders in each direction. This translates to 62500 cylinders. Each cylinder has an effective area of $100\pi$ nm$^2$ (or about 3142 nm$^2$). Therefore, the total effectively increased area is about 62500×3142 nm$^2$ (or about 1.96 E8 nm$^2$). This translates to an area enhancement factor of about 196, meaning an increased area of about 196 times larger than a nonporous planar electrode of 1000×1000 nm$^2$ in area. A similar calculation can be performed for pore sizes that are larger than 2 nm in diameter. By way of example, if the pores are about 50 nm in diameter, 500 nm in depth, and with 50 nm pitch, the effective area of the planar electrode can be calculated as follows. In an area of 1000 nm by 1000 nm (footprint), there can be approximately 10 (1000 nm/(50+50) nm) cylinders in each direction. This translates to 100 cylinders. Each cylinder has an effective area of about 78540 nm². Therefore the total effective area is about 100×78540 nm² (or about 7.85 E6 nm²). This translates to an area enhancement factor of about 8, meaning an increased area of about 8 times larger than a nonporous planar electrode of 1000×1000 nm² in area. Therefore, the effective area of the planar electrode can increase from about 8 times a nonporous planar electrode to about 196 times the same nonporous planar electrode by reducing the diameter from 50 nm to 2 nm. These increases in surface area result in capacitance increases commensurate with area increases. Therefore, capacitance of the EDLC can increase from 8 times to 196 times as compared to a planar electrode having a surface area the same as the footprint of the planar electrode (1000×1000 nm² according to the above examples). These examples show the potential of a fabrication process for increasing the surface area and the corresponding EDL capacitance in various ranges with using various geometrical designs.

Referring to FIG. 7A, a lumped parameter model is shown between a pair of planar electrodes 506/508. Two $C_{dl}$ capacitors 500 and 504 are used to represent the EDLC, discussed above. $Z_{particle}/R_{electrolyte1}$ 502 is the effective impedance of the particle 300 and the resistance of the electrolyte with the particle present, as shown in FIG. 5. With DC excitation, the $Z_{particle}$ component of $Z_{particle}/R_{electrolyte1}$ 502 is purely resistive. With AC excitation, internal structures of the particle introduce capacitive and other components to the $Z_{particle}$ component. The presence of the particle in between the electrodes results in a change in the resistance between the two electrodes 506 and 508. In one embodiment, $Z_{particle}/R_{electrolyte1}$ 502 is measured against a reference electrode pair as shown in FIG. 7B.

Referring to FIG. 7B, a pair of control planar electrodes 510 and 512 are shown. The pair of control planar electrodes 100/101 measure characteristics of only the electrolyte 520 without the particle 300 in between the electrodes. The impedance of the electrolyte between the electrodes is now $R_{electrolyte2}$ 514. The impedance $Z_{particle}/R_{electrolyte1}$ can be compared with the resistance $R_{electrolyte2}$ to determine whether a particle is present between the pair of planar electrodes 506 and 508 along with internal information of the particle.

As discussed above, one way minimize the parasitic effects of the capacitive element of EDLC in AC calculations of the $Z_{particle}/R_{electrolyte1}$ is to maximize the EDL capacitances, and thereby maximize the effective areas of these capacitors. Two different structures and associated methods of fabrication for planar electrodes are provided. Each structure increases the effective surface area of the planar electrode in order to increase the capacitance of the resulting EDLC.

Figure 8A:
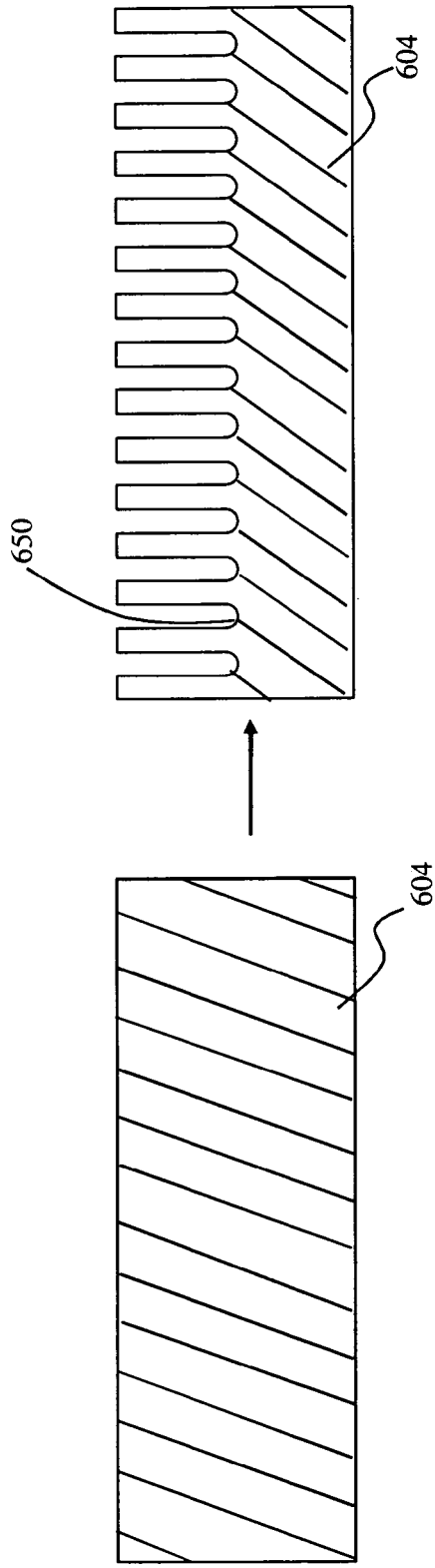
FIGS. 8A-8B depict a fabrication procedure in accordance with one embodiment.
Figure 8B:
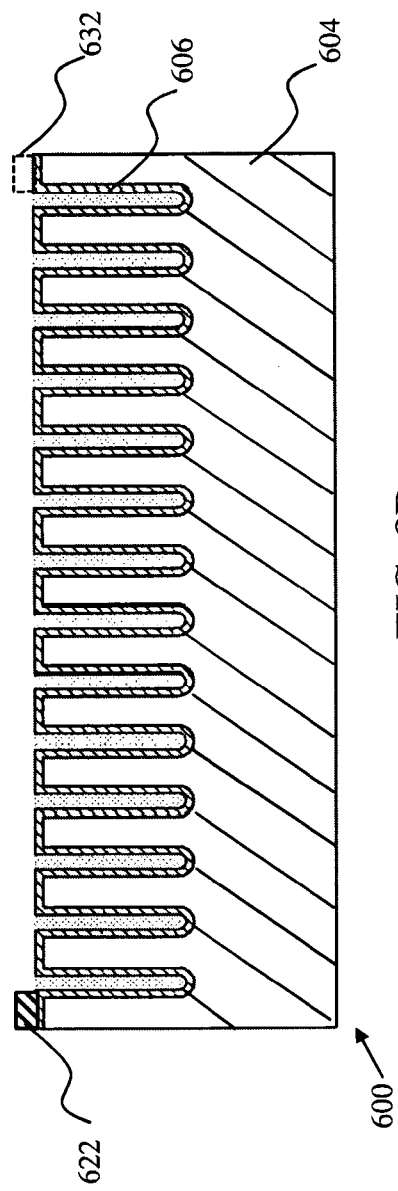

Referring to FIGS. 8A and 8B, a first structure of the planar electrode and its associated fabrication steps are shown. FIG. 8A shows a substrate 604 on the left hand side. The substrate can be silicon, glass, and the like. In one embodiment the substrate thickness can range from about 300 μm to about 500 μm. In order to develop porous features 650 shown in the right hand figure, the substrate 604 is anodized. Although both wet and dry anodization processes may be used, using dry anodization can maintain the entire process a dry process. Formation of porous features 650 as a result of anodization of silicon substrate is known in other processes. In the wet regime, silicon can be anodized in an aqueous hydrofluoric solution to generate deep penetrating pores in the silicon substrate, followed by a drying process. To control pore features, such as pore diameter and pore depth, available anodization parameters can be varied. These parameters range from silicon doping, hydrogen fluoride concentration, and anodization current. For example higher current levels can produce deeper and larger pores. Alternatively and preferably, dry anodization occurs where an anode electrode is placed on the substrate in presence of a plasma producing gas, e.g., $O_2$ or $O_2$ and Cl.

Once the porous features 650 are produced in the substrate 604, as shown in FIG. 8A, a conductive layer 606 can be deposited. Referring to FIG. 8B, a conductive layer 606 is deposited on the porous features 650. In accordance with one embodiment, the conductive layer 606 can be deposited using an atomic layer deposition (ALD) technique. Using the ALD technique, a very thin layer of conductive material, with a uniform thickness, can be produced. The thickness of the conductive layer 606 can be controlled at an atomic level. In one embodiment, the thickness of the conductive layer 606 is from about 0.1 to about 10 nm. The conductive material can be any of titanium, platinum, tungsten, aluminum, copper, iridium, and ruthenium.

ALD is a special variation of the well known chemical vapor deposition process, where the growth occurs in a cyclical fashion. In each cycle a self-limiting amount of material is deposited onto the substrate. The number of cycles where the conductive material is deposited controls the thickness of the conductive layer. One growth cycle normally includes application of precursor material followed by purging of any gases that are produced. ALD's precursor material can be gases, liquids, and solids. To keep the process as a dry process, solid precursors are preferred. The ALD process can be used to not only deposit the conductive material layer 606 but also to deposit a contact terminal 622. Alternatively, and for faster processing contact terminals 622 can be deposited using general thin-film deposition processes, including physical vapor deposition (e.g., evaporation, sputtering, etc.) and chemical vapor deposition techniques.

The planar electrode 600 shown in FIG. 8B is suitable for direct connectivity with the conductive material layer 606. The planar electrode 600 in accordance with FIG. 8B is referred to as the planar connectivity embodiment. An advantage of this type of connectivity is that no distinct template is required, which will be discussed in greater detail below. Therefore, the planar electrode 600 is a simple device requiring simple fabrication steps. A disadvantage of the planar electrode with the planar connectivity embodiment, in some applications, is that the conduction path, i.e., the length of the electrode along the porous features, is a long path. Given the thickness of the conductive material layer 606, i.e., from about 0.1 nm to about 10 nm, the conduction path could add a significant amount of resistance. In these cases, adding a second contact terminal 632, shown in FIG. 8B with dashed lines, will assist in reducing the added resistance. Even with two contact terminals 622/632, however, the added resistance may be too excessive for certain applications.

Figure 9A:
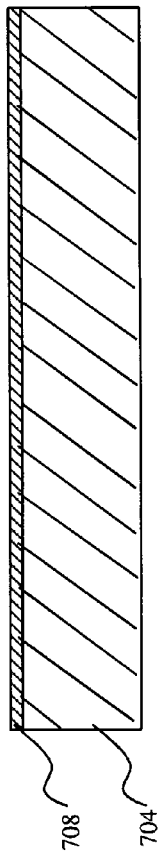
FIGS. 9A-9D depict a fabrication procedure in accordance with one embodiment.

Referring to FIGS. 9A-9D, an alternative embodiment or method of processing of a planar electrode 700 according to one embodiment with the associated fabrication procedure is shown. The planar electrode 700 in accordance with FIGS. 9A-9D is referred to as the vertical connectivity embodiment. Referring to FIG. 9A, a substrate 704 is provided. The substrate can be silicon, glass, or the like. A conduction layer 708 is deposited on the substrate 704. As will be seen below, the conduction layer 708 provides a low resistance path for the planar electrode 700. The conduction layer 708 is a conductive material, e.g., a metal, e.g. copper. The conduction layer 708 can be deposited using general thin-film deposition processes, including physical vapor deposition (e.g., evaporation, sputtering, etc.) and chemical vapor deposition techniques. Same concept as implementing the contact terminal 622 in FIG. 8B can also be applied in this alternative embodiment in order to create horizontal electrical connection instead of vertical electrical connection using the conduction layer 708.

Figure 9B:
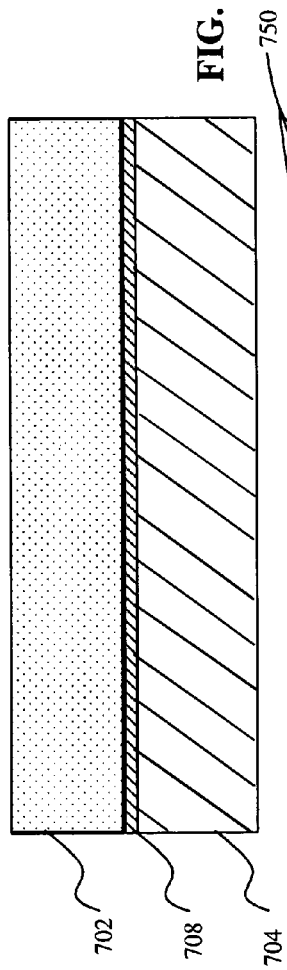

Referring to FIG. 9B, a template 702 is used to provide porous features 750 (FIG. 9C) needed to increase electrode surface area. The template 702 is necessary since the porous features 750 cannot be made directly on the conduction layer 708. In one embodiment the template 702 can be aluminum oxide, i.e., alumina. The template 702 can be a thin film that can be deposited using physical vapor deposition (e.g., evaporation, sputtering, etc.), chemical vapor deposition, or other electro-deposition techniques, all of which are known in other processes. The thickness of template 702 can range from about 0.1 μm to about 10 μm depending on the specification of area enhancement factor from the proposed process.

Figure 9C:
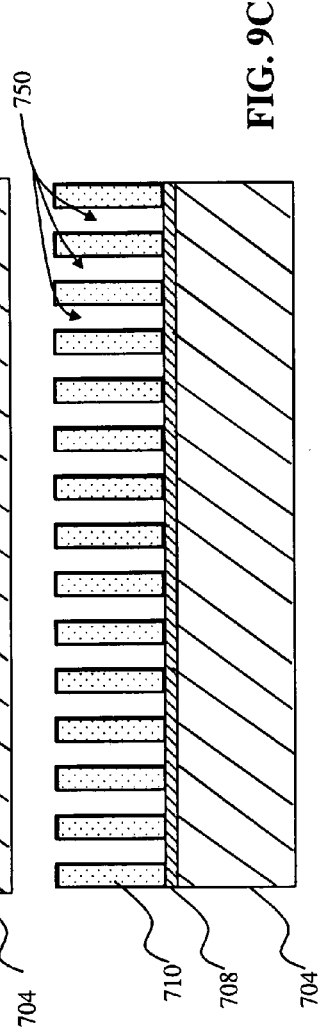

Referring to FIG. 9C, porous features 750 are generated on the template. Porous applications of templates using anodic porous alumina are well known in the art. Aluminum with high purity can be anodically treated with acid solutions, e.g., sulfuric acid, to produce self-organizing porous features with well-controlled pore dimensions, e.g. pore diameters. In order to develop the porous features 750, the template 702 is anodized. Although both wet and dry anodization processes are proposed, using a dry anodization process can maintain the entire process a dry process. Formation of porous features 750 as a result of anodization of template 702 in the wet regime can be accomplished by anodizing the template in an aqueous hydrofluoric solution to generate deep penetrating pores in the template, followed by a drying process. To control pore features such as pore diameter and pore depth, available anodization parameters can be varied. These parameters range from hydrogen fluoride concentration and anodization current densities. For example higher current levels can produce deeper and larger pores. Alternatively, dry anodization occurs where an anode electrode is placed on the template 702 in presence of a plasma producing gas, e.g., $O_2$ or $O_2$ and Cl.

Figure 9D:
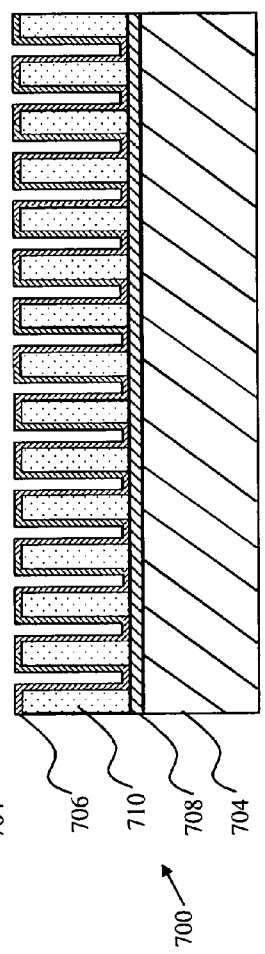

Once the porous features 750 are produced in the template 702, as shown in FIG. 9C, where template slices 710 of template 702 provide a support structure for porous features 750, a conductive layer 706 can be deposited on the planar electrode. Referring to FIG. 9D, the conductive layer 706 is deposited on the template slices 710. The conductive layer 706 and 606 can be of any of metallic (e.g., titanium, platinum, tungsten, aluminum, copper, iridium, and ruthenium, etc.) and ceramic (e.g., titanium, nitride, zinc oxide, etc.) materials.

In accordance with the embodiment shown in FIGS. 9A-9D, the conductive layer 706 can be deposited using an atomic layer deposition (ALD) technique. Using the ALD technique, a very thin layer of conductive material, with a uniform thickness, can be produced. The thickness of the conductive layer 706 is from about 0.1 to about 10 nm.

In one embodiment, the thickness of the conduction layer 708 can range from about 0.1 μm to about 10 μm. Thus, the thickness of the conduction layer 708 is much greater than the thickness of the conductive material layer 606 (FIG. 8B). The larger thickness of the conduction layer 708 results in a smaller resistivity than the conductive layer 606. Also, the length of the conduction layer 708, i.e., the overall length of the planar electrode, is much less than the length of the conductive layer 606, i.e., the path which traverses along the entire path of the porous features 650 (FIG. 8B). The shorter length of the conduction layer 708 results in a further smaller resistivity than the conductive layer 606. For both of these reasons, the resistivity of the conduction layer 700 is much less than the conductive material layer 106. The lower resistivity remedies the long conduction path challenge presented in accordance with the planar connectivity embodiment, shown in FIG. 8B. Furthermore, due to the thicker conduction layer 708, i.e., from about 0.1 μm to about 10 μm, lead wires (not shown in FIGS. 9A-9D) can be contacted directly to the conduction layer 708 without the need for contact terminals 622/632 (FIG. 8B).

Referring to FIGS. 10A-10C, different configurations of planar electrodes pairs with associated current lines are shown.

Referring to FIG. 10A, a pair of planar electrodes 900/901 are positioned in an up-down manner. Flow of particles can be in the directions of the arrow 908. The current lines 910 pass from one electrode 900 to the other electrode 901. Passage of a particle between the two electrodes 900/901 changes the impedance between the electrodes 900/901, e.g., by displacing the electrolyte 902. The change in the impedance can be used to detect the presence of a particle and further information about the makeup of the particle.

Referring to FIG. 10B, two pairs of planar electrodes 800/801 and 850/851 are positioned in an up-down and side-by-side coplanar manner. Flow of particles can be in the directions of the arrow 808. The current lines 810/860 pass from one electrode 800/850 to the other electrode 801/851. Passage of a particle between either of the two electrodes 800/801 or 850/851 changes the impedance between the electrodes, e.g., by displacing the electrolyte 802/852. The change in the impedance can be used to detect the presence of a particle and further information about the makeup of the particle. The embodiment shown in FIG. 10A, can be advantageously used in a differential sensing circuit, where the difference in impedance characteristics of one pair of planar electrodes, e.g., 800/801, and the other pair of planar electrodes, .e.g., 850/851, can be used to eliminate or minimize offsets in measurements. Such differential measurements are known in other processes.

Referring to FIG. 10C, a pair of planar electrodes 950/951 are positioned in a side-by-side coplanar manner. Flow of particles can be in the directions of the arrow 958. The current lines 960 pass from one electrode 950 to the other electrode 951. Passage of a particle in the vicinity of the two electrodes 950/951 changes the impedance between the electrodes 950/951, e.g., by displacing the electrolyte 952. The change in the impedance can be used to detect the presence of a particle and further information about the makeup of the particle.

In one embodiment, only one of the planar electrodes of the pair of planar electrodes is constructed with porous features described above. The other electrode can be an ordinary electrode without any of the porous features. Replacing one of the planar electrodes with an ordinary electrode may be sufficient to achieve the desired goal of increasing the capacitance of the two-electrode structure.

Figure 11A:
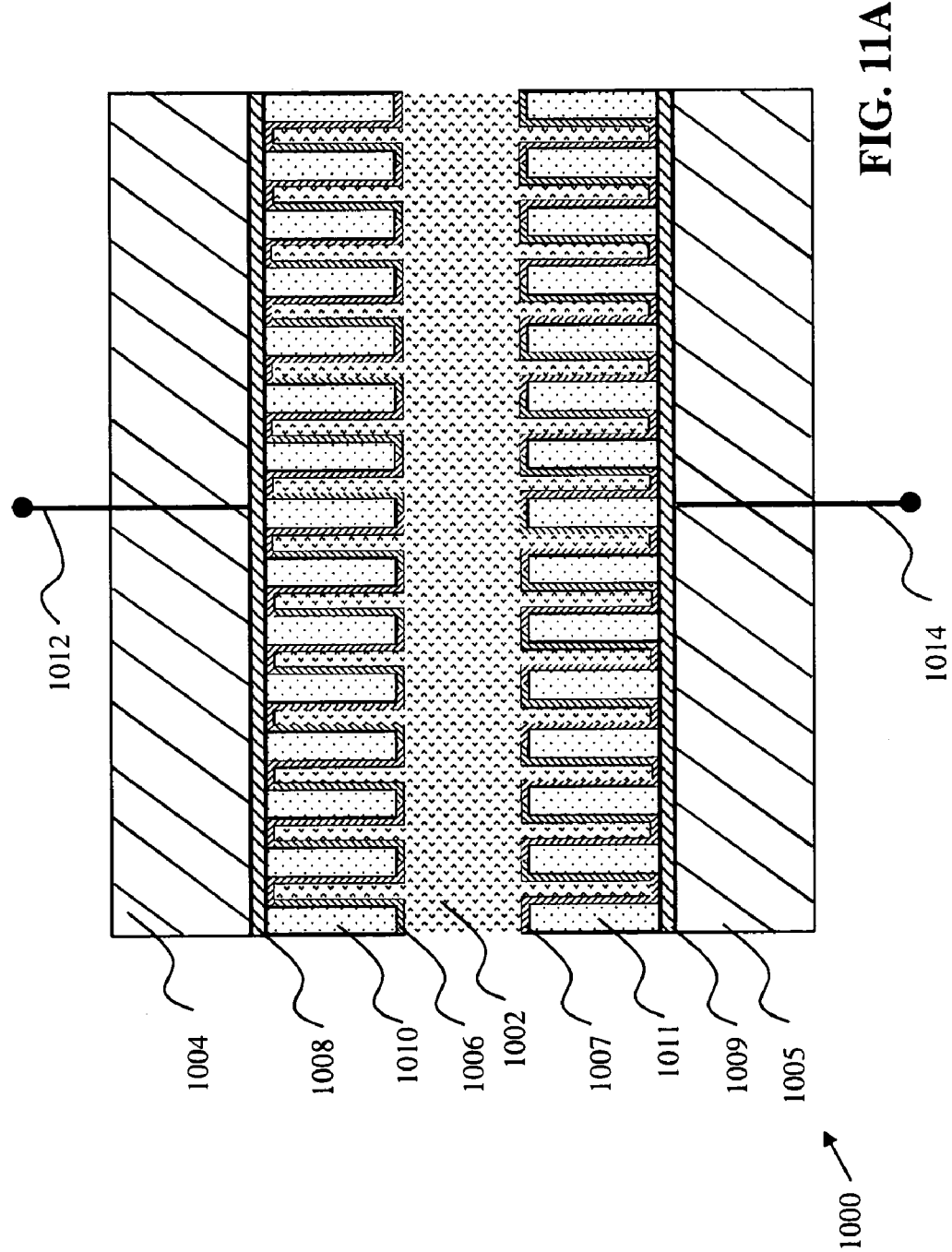
FIGS. 11A-11B depict two embodiments of a pair of planar electrodes used as supercapacitors.

In one embodiment, the pair of planar electrodes can be used to form a supercapacitor. Referring to FIG. 11A, an exemplary embodiment of a supercapacitor 1000 is provided. The embodiment shown in FIG. 11A is similar to the planar electrode embodiment shown in FIG. 9D, however, the supercapacitor 1000 can also be made with an embodiment similar to that shown in FIG. 8B. Substrates 1004/1005, conduction layers 1008/1009, template structure 1010/1011, conductive layer 1006/1007 make up each electrode. An electrolyte 1002 is provided between the electrodes. Contact wire 1012 is connected to the conduction layer 1008 and contact wire 1014 is connected to conduction later 1009. Contact wires 1012 and 1014 provide electrical connectivity with outside circuitry. An EDLC forms on each electrode. The combination of capacitors of the EDLCs at each electrode provides the equivalent capacitance of the supercapacitor 1000.

Figure 11B:
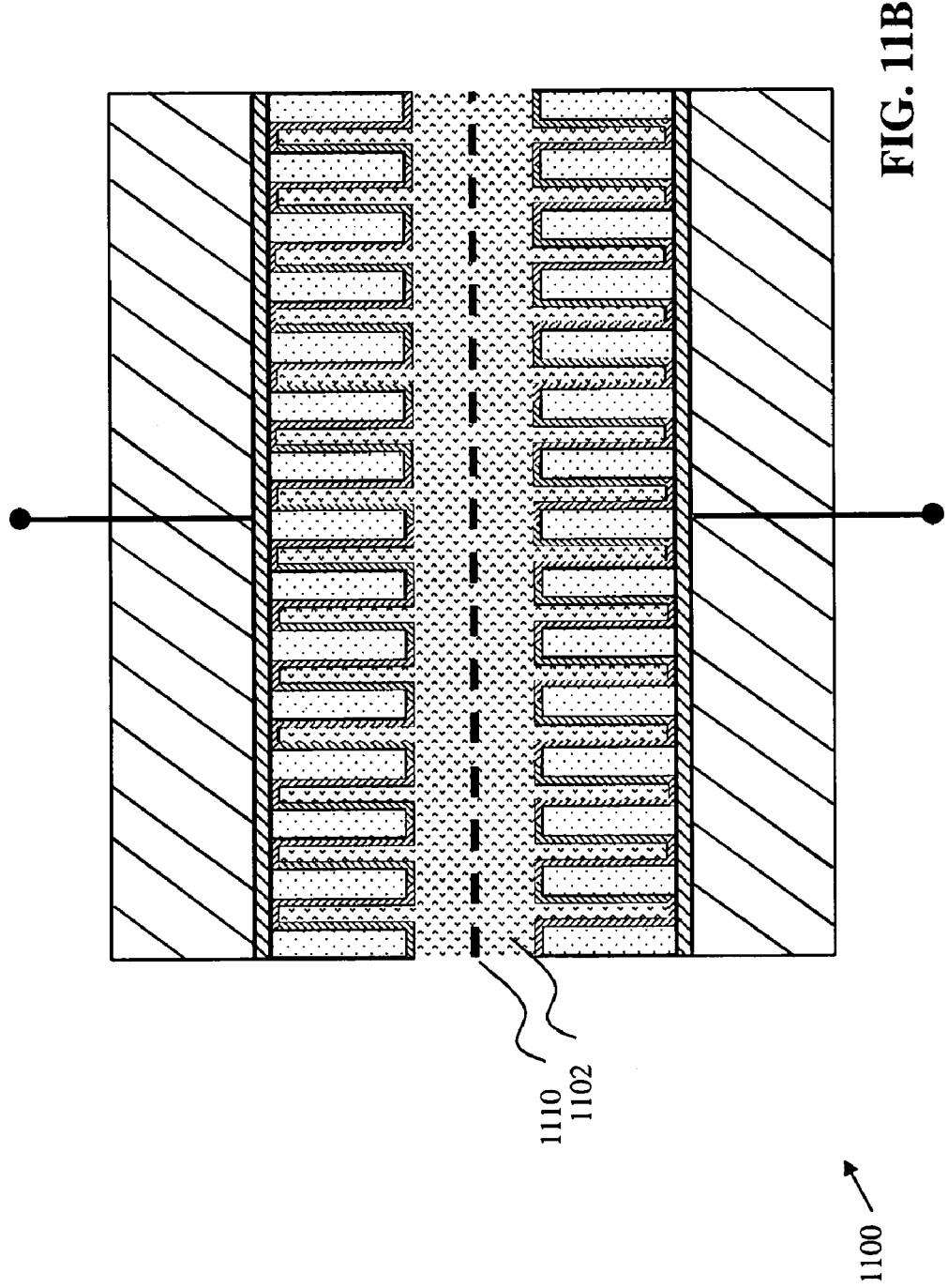

According to one embodiment, a separator can be used in a supercapacitor implementation of the planar electrodes for enhanced charge separation. Referring to FIG. 11B, a supercapacitor 1100 is shown. The supercapacitor 1100 is the same as the supercapacitor 1000 shown in FIG. 11A with the addition of the separator 1110. The separator 1110 can be made of a polymer or other carbon-based materials. The separator 1110 can provide a separation of charges in the electrolyte 1102 resulting in enhanced EDLCs on each electrode.

Referring to equation (3), the small distance between the layers of positive and negative charges, the large surface area of each planar electrode, and a high dielectric constant result in a superior capacitance formed by each EDLC. The advantages of a supercapacitor made from a pair of planar electrodes, as described above, over a capacitor made according to ordinary or even exotic techniques are many. First, the planar electrodes of the supercapacitor have large surface areas and/or are easy to manufacture. Although some exotic methods of making large surface area capacitors result in electrode surface areas that are similar to the electrodes discussed above, the methods of making those electrodes are more complex.

Second, the distance between layers of charge formed in the EDLC is very small (on the order of nanometers) and the supercapacitor is not prone to leakage. Although some exotic methods of making capacitors with large capacitance result in very thin dielectrics between the electrodes, even a single electrical shortage between the electrodes can result in an inoperable device. The supercapacitor, however, advantageously provide EDLC on each electrode that are not prone to electrical shortage. This is because each EDLC is inherently formed by the electrolyte making contact with the electrode. Presence of an air bubble does not cause a catastrophic failure of the device similar to a shorting condition described above.

Third, the dielectric constant of the dielectric material between the top and bottom electrodes can be very high as compared to dielectric constant of material available according to ordinary or even exotic methods of making capacitors. For all these reasons, the supercapacitor provides superior capacitance.

While the invention has been illustrated and described in detail in the drawings and foregoing description, the same should be considered as illustrative and not restrictive in character. It is understood that only the preferred embodiments have been presented and that all changes, modifications and further applications that come within the spirit of the invention are desired to be protected.

We claim:

1. A method for fabricating a pair of large surface area planar electrodes, comprising:
    forming a first template above a first substrate, the first template having a first plurality of pores;
    coating the first plurality of pores of the first template with a first layer of conducting material to form a first electrode;
    placing the first plurality of pores of the first electrode in proximity to a second electrode, thereby forming a gap between the first plurality of pores and the second electrode; and
    filling the gap and the plurality of pores with an electrolyte material.

2. The method of claim 1, further comprising:
    forming a second template above a second substrate, the second template having a second plurality of pores; and
    coating the second plurality of pores of the second template with a second layer of conducting material to form the second electrode.

3. The method of claim 2, the forming of the first template and the second template comprising:
    anodizing the first template and the second template.

4. The method of claim 1, further comprising:
    forming a first conduction layer between the first substrate and the first template.

5. The method of claim 4, further comprising:
    forming a second template above a second substrate, the second template having a second plurality of pores;
    coating the second plurality of pores of the second template with a second layer of conducting material to form the second electrode; and
    forming a second conduction layer between the second substrate and the second template.

6. The method of claim 5, the forming of the first conduction layer and the second conduction layer comprising:
    atomic layer depositing the first conduction layer on the first substrate; and
    atomic layer depositing the second conduction layer on the second substrate.

7. The method of claim 5, the forming of the first conduction layer and the second conduction layer comprising
    plating the first conduction layer on the first substrate; and
    plating the second conduction layer on the second substrate.

8. The method of claim 2, the forming of the first template and the second template comprising:
    anodizing the first template and the second template.

9. The method of claim 2, further comprising:
    coupling a first electrical contact with the first layer of conducting material of the first electrode; and
    coupling a second electrical contact with the second layer of conducting material of the second electrode.

10. The method of claim 4, further comprising:
    coupling a first electrical contact with the first conduction layer; and
    coupling a second electrical contact with the second conduction layer.

11. The method of claim 2, wherein each of the first substrate and the second substrate is one of a semiconductor and an insulator.

12. The method of claim 2, wherein each of the first substrate and the second substrate is one of silicon, glass, and gallium arsenide.

13. The method of claim 2, wherein each of the first layer of conducting material and the second layer of conducting material is one of a titanium, platinum, tungsten, aluminum, copper, iridium, ruthenium, titanium nitride and zinc oxide.

14. The method of claim 4, wherein the first plurality of pores are in communication with the first conduction layer and the coating the first plurality of pores includes contacting the first layer of conducting material with the first conduction layer.

15. The method of claim 5, wherein:
    the first plurality of pores are in communication with the first conduction layer and the coating the first plurality of pores includes contacting the first layer of conducting material with the first conduction layer; and
    the second plurality of pores are in communication with the second conduction layer and the coating the second plurality of pores includes contacting the second layer of conducting material with the second conduction layer.

* * * * *